United States Patent [19]

Okamura et al.

[11] Patent Number: 4,457,955
[45] Date of Patent: Jul. 3, 1984

[54] PROCESS FOR PRODUCING MAGNETIZABLE PARTICLES

[75] Inventors: Kazuo Okamura, Itami; Kohji Tamura, Kawanishi; Shigeo Daimon; Yoshiyuki Shibuya, both of Osaka, all of Japan

[73] Assignee: Daikin Kogyo Company, Ltd., Osaka, Japan

[21] Appl. No.: 454,325

[22] Filed: Dec. 29, 1982

[30] Foreign Application Priority Data

Dec. 29, 1981 [JP] Japan .................. 56-210787
Nov. 10, 1982 [JP] Japan .................. 57-198138

[51] Int. Cl.$^3$ ............... C01G 49/06; C01G 49/08
[52] U.S. Cl. .................. 427/127; 252/62.56; 427/377
[58] Field of Search .......... 252/62.56; 427/127, 427/128, 377

[56] References Cited

U.S. PATENT DOCUMENTS 4,066,565 1/1978 Sasazawa et al. .............. 252/62.56
4,224,175 9/1980 Montino et al. ............... 252/62.56
4,267,207 5/1981 Sasazawa et al. ........... 252/62.56 X
4,296,149 10/1981 Rudolf et al. ............... 252/62.56 X

*Primary Examiner*—Jack Cooper
*Attorney, Agent, or Firm*—Armstrong, Nikaido, Marmelstein & Kubovcik

[57] ABSTRACT

A process for producing cobalt-modified iron oxide particles, which comprises the steps of:
(1) adding to magnetic iron oxide particles
 (a) a cobalt compound,
 (b) an iron component which is either ($b_1$) a ferric compound at an atomic ratio to the cobalt compound in the range of 0.68 to 2 or ($b_2$) a combination of a ferrous compound and a ferric compound, and
 (c) an alkali at a concentration enough to cause the cobalt and iron to precipitate as hydroxides; and
(2) heating the mixture at a temperature of at least 50° C. and not higher than the reflux temperature thereof in a non-oxidizing atmosphere.

9 Claims, No Drawings

PROCESS FOR PRODUCING MAGNETIZABLE PARTICLES

This invention relates to a process for producing magnetizable particles, and more particularly to a process for producing magnetizable cobalt-modified iron oxide particles.

Recently for magnetizable particles for magnetic recording the performance requirement has become increasingly severe. For example, in order to increase density of storage, they are required to have high coercive force, while in order to increase output power of signal they are also required to have high magnetic flux density. However, increase only in magnetic flux density of magnetizable particles will result in unsatisfactory improvement, for example, in poor linearity in the high frequency range of the magnetic recording tape, due to increased self-demagnetization. Therefore, it must be increased also in coercive force, and it is still desired to develop magnetizable particles having well-balanced, high coercive force and magnetic flux density.

It is known that the magnet characteristics of iron oxide particles, for example, depend on the residual magnetic flux density (Br) and the coercive force (Hc) and that the larger the area defined by $(BH)_{max}$, the more excellent its characteristics as a magnet (Hyomen, Vol. 16, No. 6, p. 380).

Various investigations have heretofore been made on magnetizable materials which comprises iron oxide particles. It has recently been proposed that particles of $\gamma$-$Fe_2O_3$ or magnetite is dispersed in a mixed aqueous solution of a ferrous salt and a cobalt salt or in an aqueous dispersion containing ferrous hydroxide and cobalt hydroxide, the resulting dispersion being heated in an non-oxidizing atmosphere in the presence of an alkali to yield cobalt-modified magnetite particles (Japanese Examined Patent Application Nos. 36,751/1977 and 35,863/1977). In these methods, as suggested in these published applications, polycondensation reaction is considered to occur between the $\gamma$-$Fe_2O_3$ particles and $Fe(OH)_2$ and $Co(OH)_2$ pricipitates through hydroxyl groups, resulting in diffusion of ferrous ions and cobalt ions into the $\gamma$-$Fe_2O_3$ particles. In fact, it is described therein that the desired modification is caused by diffusion of ferrous ions and cobalt ions. In the methods, it is characterized that the heating step is carried out in a non-oxidizing atmosphere in order to prevent oxidation of ferrous hydroxide and cobalt hydroxide in the dispersion. Thus, the above-mentioned Japanese applications do not suggest anything about complete or partial replacement of the ferrous compound by a ferric compound which is in a higher state of oxidation than ferrous compounds and they apparently exclude addition of any ferric compounds.

It is disclosed in Japanese Examined Patent Application No. 49,128/1982 (corresponding to U.S. Pat. No. 4,066,565) that cobalt-modified iron oxide particles are produced by adding an aqueous alkali solution and $Co^{2+}$ and $Fe^{3+}$ ions to a dispersion of magnetic iron oxide particles and heating the mixture at 80° C. or above, the amount of said $Fe^{3+}$ ions added being not more than one equivalent based on the $Co^{2+}$ ions (i.e., not more than 0.67 in atomic ratio to the Co). However, the method disclosed therein is not economical because costly $Co^{2+}$ ions are used in a relatively large amount.

It is an object of this invention to provide a process capable of producing cobalt-modified iron oxide particles which have high and well-balanced coercive force and magnetic flux density.

Another object of the invention is to provide a process for producing cobalt-modified iron oxide particles having high coercive force and high magnetic flux density, wherein said particles, having the same coercive force as in those produced in the prior art methods, can be obtained with a smaller amount of cobalt.

These and other objects of the invention will be apparent from the following description.

The present invention provides a process for producing cobalt-modified iron oxide particles, which comprises the steps of:

(1) adding to magnetic iron oxide particles (a) a cobalt compound, (b) an iron component which is either ($b_1$) a ferric compound at an atomic ratio to the cobalt compound in the range of 0.68 to 2 or ($b_2$) a combination of a ferrous compound and a ferric compound, and (c) an alkali at a concentration enough to cause the cobalt and iron to precipitate as hydroxides; and (2) heating the mixture at a temperature of at least 50° C. and not higher than the reflux temperature thereof in a non-oxidizing atmosphere.

In one embodiment, only a ferric compound is added at an atomic ratio to the cobalt compound in the range of 0.68 to 2. It has been found that the magnetic particles obtained have high coercive force and high magnetic flux density which are well balanced.

In another embodiment, a ferrous compound and a ferric compound are added in combination. It has been found that a deposited layer which is different in structure from that in the prior art methods is formed on the surfaces of the particles of iron oxide such as $\gamma$-$Fe_2O_3$ and that magnetizable particles having a coercive force at the same level as in the prior art methods can be produced by the use of less cobalt, said product having high coercive force and high magnetic flux density which are well balanced.

Particularly in the latter embodiment, a novel and unique process in which both of a ferrous and a ferric compounds are added to magnetic particles along with a cobalt compound is employed. It is believed that the desired novel magnetizable particles are obtained by the following mechanism. The above three metallic compounds interact with one another on the surfaces of the magnetic iron oxide particles, thereby forming an amorphous complex ferrite comprising these metals in a short period of time. Thereafter crystallization of the complex ferrite proceeds gradually. Thus, the mechanism of modification is different from that in the prior art methods in which the desired modification is accomplished by diffusion.

As mentioned above, the present invention provides magnetizable particles having a different structure by a different mechanism of formation from those in the prior art methods, and they are superior in various properties including coercive force, saturation magnetic flux density and residual magnetic flux density.

The magnetic iron oxide particles used in the invention may be prepared by a conventional method and includes maghemite ($\gamma$-$Fe_2O_3$), magnetite ($Fe_3O_4$) and Berthollide (iron oxides having a degree of oxidation intermediate between those of maghemite and magnetite) particles. The cobalt compound, ferrous compound and ferric compound used in the invention include sulfates, nitrates, chlorides and hydroxides of $Co^{2+}$, $Fe^{2+}$ and $Fe^{3+}$, respectively.

In the process according to the invention, e.g., an aqueous dispersion of the magnetic iron oxide particles in which the cobalt compound and the iron compound or compounds are dissolved is treated with an alkali at a concentration enough to cause the cobalt and iron ions present in the dispersion to precipitate as hydroxides, and the dispersion is heated at a temperature of at least 50° C. and not higher than the reflux temperature thereof in a non-oxidizing atmosphere to give the desired cobalt-modified iron oxide particles. The alkali includes hydroxides and carbonates of alkali metals such as Na, K and Li and alkaline earth metals such as Ca, Ba and Mg as well as ammonia and ammonium hydroxide. They are preferably added in the form of solid or aqueous solution.

The cobalt compound is preferably used in an amount of from 0.3 to 10 parts, more preferably from 0.5 to 5 parts by weight as cobalt metal per 100 parts by weight of the magnetic iron oxide particles.

In the embodiment of the invention where only a ferric compound is added as the iron component, the amount of the ferric compound used should be so selected that the ratio of iron atoms in the ferric compound to cobalt atoms in the cobalt compound is in the range of 0.68 to 2, preferably in the range of 1 to 1.8. In such range are obtained magnetizable particles having well-balanced coercive force and magnetic flux density.

In another embodiment where a combination of a ferrous compound and a ferric compound is added as the iron component, the ferrous compound is used in such an amount that the ratio of iron atoms in the ferrous compound to the cobalt atoms in the cobalt compounds is in the range of 1.3 to 2.5 while the ferric compound is preferably used in such an amount that the ratio of iron atoms in the ferric compound to the cobalt atoms is in the range of 0.5 to 1.3. These ranges are preferable in order to obtain the desired magnetizable particles.

The alkali should be added in an amount sufficient to cause the iron and cobalt ions in the reaction mixture to precipitate as hydroxides. Usually it is added so as to raise the pH of the reaction medium to at least 9.5, preferably to at least 12. The alkali may be added at any stage during preparation of the dispersion.

The dispersion is then heated in a non-oxidizing atmosphere in order to prevent oxidation of $Co^{2+}$ into $Co^{3+}$. If the heating is conducted in an oxidizing atmosphere, modification with cobalt does not proceed sufficiently and the desired product of this invention can not be obtained. The term "non-oxidizing atmosphere" means herein to exclude particularly to blow into the atmosphere oxygen or any oxygen-containing gas and it includes any conditions which are not substantially affected by oxygen, for example, a condition in which the dispersion is heated at reflux temperature. The non-oxidizing atmosphere includes, of course, heating in the stream of an inert gas such as nitrogen and blowing of such a gas.

The magnetizable particles thus obtained are washed with water, filtered and dried in a conventional manner prior to use. If desired, they may be further oxidized at about 200° to 300° C. prior to use.

The cobalt-modified iron oxide particles produced by the process according to the invention are less susceptible to demagnetization under heat or pressure, not susceptible to change with time in coercive force, have good stability to pressure and impact and possess high coercive force and high saturation and residual magnetic flux density as is apparent from the following examples, and hence they are suitable for use as magnetizable material for magnetic recording.

Particularly in the cases where a combination of a ferrous compound and a ferric compound is used, the amount of the relatively expensive cobalt compound required to obtain magnetizable particles having coercive force of the same order as in the prior art magnetizable particles can be decreased as compared with the cases where only a ferrous compound is used. It, therefore, contributes to substantial reduction in cost of the magnetizable particles.

The following examples are given to illustrate the invention.

EXAMPLE 1

To 15 g of $\gamma$-$Fe_2O_3$ (average particle length 0.45 μm; acicular ratio 1/9; coercive force 350 Oe) in a 300 ml four-necked flask equipped with a reflux condenser and a stirrer was added 100 g of aqueous 25 wt % NaOH solution so as to adjust the pH of the solution to at least 12 and the mixture was heated to 70° C. with stirring. To this was added a solution of 3.7 g of cobalt sulfate heptahydrate and 2.8 g of ferric sulfate hydrate containing 65 wt % ferric sulfate dissolved in 100 g of water and then the mixture was heated with stirring for 4 hours at the reflux temperature (103° C.). Thereafter the resulting slurry was washed with water, filtered and dried for 24 hours at 60° C. to give cobalt-modified particles as a product. When they were examined under the electron microscope, only acicular particles were observed. The saturation magnetic flux density (Bm) of the particles was 3210 gausses, the residual magnetic flux density (Br) was 1675 gausses and the coercive force (Hc) was 515 Oe. These magnetic characteristics of the particles were determined by the gauss meter method using a Hall element wherein the coefficient of packing was 0.2. In the following examples the magnetic characteristics of the products were also determined in the same manner.

EXAMPLE 2

The procedure of Example 1 was repeated except that the amount of the ferric sulfate hydrate was changed from 2.8 g to 5.55 g. The saturation magnetic flux density of the resulting cobalt-modified particles was 3315 gausses, the residual magnetic flux density was 1695 gausses and the coercive force was 500 Oe.

EXAMPLE 3

The procedure of Example 1 was repeated except that the $\gamma$-$Fe_2O_3$ was replaced by magnetite having a coercive force of 390 Oe. The resulting cobalt-modified particles had a saturation magnetic flux density of 3420 gausses, a residual magnetic flux density of 1780 gausses and a coercive force of 560 Oe.

EXAMPLE 4

To 15 g of $\gamma$-$Fe_2O_3$ (average particle length 0.45 μm; acicular ratio 1/9; coercive force 350 Oe) in a 300 ml four-necked flask equipped with a reflux condenser and a stirrer was added 100 g of aqueous 25 wt % NaOH solution so as to adjust the pH of the solution to 12 or above and the mixture was heated to 70° C. with stirring. To the resulting mixture were added a solution of 3.7 g of cobalt sulfate heptahydrate, 2.43 g of ferric sulfate hydrate containing 65 wt % ferric sulfate and 7.32 g of ferrous sulfate heptahydrate dissolved in 100 g of water and the mixture was heated for 4 hours with stirring at a reflux temperature (103° C.). Thereafter the resulting slurry was washed with water, filtered and dried for 24 hours at 60° C. to obtain cobalt-modified particles. Observation of the particles under the electron microscope showed only acicular particles. The saturation magnetic flux density of the particles was 3250 gausses, the residual magnetic flux density was 1755 gausses and the coercive force was 565 Oe.

EXAMPLE 5

The procedure of Example 4 was repeated except that the amount of the ferric sulfate hydrate was changed from 2.43 g to 4.86 g. The resulting cobalt-modified particles had a saturation magnetic flux density of 3285 gausses, a residual magnetic flux density of 1680 gausses and a coercive force of 570 Oe.

COMPARATIVE EXAMPLE 1

The procedure of Example 4 was repeated except that the ferric sulfate hydrate was omitted. The resulting particles had a saturation magnetic flux density of 3045 gausses, a residual magnetic flux density of 1570 gausses and a coercive force of 530 Oe.

COMPARATIVE EXAMPLE 2

The procedure of Example 4 was repeated except that the amount of the ferric sulfate hydrate was changed from 2.43 g to 1.62 g. The resulting particles had a saturation magnetic flux density of 3205 gausses, a residual magnetic flux density of 1670 gausses and a coercive force of 543 Oe.

COMPARATIVE EXAMPLE 3

The procedure of Example 4 was repeated except that the amount of the ferric sulfate hydrate was changed from 2.43 g to 5.67 g. The resulting particles had a saturation magnetic flux density of 3060 gausses, a residual magnetic flux density of 1530 gausses and a coercive force of 530 Oe.

The results of Examples 4 and 5 and Comparative Examples 1 to 3 are summarized in Table 1 below.

TABLE 1

|  | $Fe^{2+}/Co^{2+}$ atomic ratio | $Fe^{3+}/Co^{2+}$ atomic ratio | Hc | Br | Bm |
| --- | --- | --- | --- | --- | --- |
| Comparative Example 1 | 2.0 | 0 | 530 | 1570 | 3045 |
| Comparative Example 2 | 2.0 | 0.4 | 543 | 1670 | 3205 |
| Example 4 | 2.0 | 0.6 | 565 | 1755 | 3250 |
| Example 5 | 2.0 | 1.2 | 570 | 1680 | 3285 |
| Comparative Example 3 | 2.0 | 1.4 | 530 | 1530 | 3060 |

EXAMPLE 6

The procedure of Example 4 was repeated except that the amount of the ferrous sulfate heptahydrate was changed from 7.32 g to 5.5 g and that of the ferric sulfate hydrate, from 2.43 g to 2.8 g. The resulting cobalt-modified particles had a saturation magnetic flux density of 3145 gausses, a residual magnetic flux density of 1805 gausses and a coercive force of 640 Oe.

EXAMPLE 7

The procedure of Example 4 was repeated except that the ferrous sulfate heptahydrate was used in the amount of 9.15 g in lieu of 7.32 g. The resultant cobalt-modified particles had a saturation magnetic flux density of 3150 gausses, a residual magnetic flux density of 1610 gausses and a coercive force of 575 Oe.

COMPARATIVE EXAMPLE 4

The procedure of Example 4 was repeated except that the amount of the ferrous sulfate heptahydrate was changed from 7.32 g to 10.98 g and that of the ferric sulfate hydrate, from 2.43 g to 4.86 g. The resulting particles had a saturation magnetic flux density of 3110 gausses, a residual magnetic flux density of 1510 gausses and a coercive force of 515 Oe.

The results of Examples 5 to 7 and Comparative Example 4 are summarized in Table 2 below in which the results of Example 1 are also included for reference.

TABLE 2

|  | $Fe^{2+}/Co^{2+}$ atomic ratio | $Fe^{3+}/Co^{2+}$ atomic ratio | Hc | Br | Bm |
| --- | --- | --- | --- | --- | --- |
| Example 1 | 0 | 0.7 | 515 | 1675 | 3210 |
| Example 6 | 1.5 | 0.7 | 640 | 1805 | 3145 |
| Example 7 | 2.5 | 0.6 | 575 | 1610 | 3150 |
| Example 5 | 2.0 | 1.2 | 570 | 1680 | 3285 |
| Comparative Example 4 | 3.0 | 1.2 | 515 | 1510 | 3110 |

We claim:
1. A process for producing cobalt-modified iron oxide particles, which comprises the steps of:
 (1) forming a slurry by adding to magnetic iron oxide particles dispersed in an aqueous solution
  (a) a cobalt compound,
  (b) an iron component which is a combination of a ferrous compound and a ferric compound, at a Fe/Co atomic ratio in the range of 1.3 to 2.5 for the ferrous compound and 0.5 to 1.3 for the ferric compound, and
  (c) an alkali at a concentration enough to cause the cobalt and iron to precipitate as hydroxides; and
 (2) heating the slurry at a temperature of at least 50° C. and not higher than the reflux temperature thereof in a non-oxidizing atmosphere.

2. A process as defined in claim 1 wherein the cobalt compound is added in an amount of 0.3 to 10 parts by weight as Co atom per 100 parts by weight of the magnetic iron oxide particles.

3. A process as defined in claim 2 wherein the amount of the cobalt compound is 0.5 to 5 parts by weight as Co atom per 100 parts by weight of the magnetic iron oxide particles.

4. A process as defined in claim 1 wherein the magnetic iron oxide is $\gamma$-$Fe_2O_3$, $Fe_3O_4$ or a Berthollide iron oxide having a degree of oxidation intermediate between those of $\gamma$-$Fe_2O_3$ and $Fe_3O_4$.

5. A process as defined in claim 1 wherein the cobalt compound is sulfate, nitrate, chloride or hydroxide of Co(II).

6. A process as defined in claim 1 wherein the ferrous compound is sulfate, nitrate, chloride or hydroxide of Fe(II).

7. A process as defined in claim 1 wherein the ferric compound is sulfate, nitrate, chloride or hydroxide of Fe(III).

8. A process as defined in claim 1 wherein the alkali is added at a concentration enough to adjust the pH of the reaction system to 9.5 or greater.

9. A process as defined in claim 8 wherein the alkali is added at a concentration enough to adjust the pH of the reaction system to 12 or greater.

* * * * *